(12) United States Patent
Chan et al.

(10) Patent No.: US 9,788,200 B2
(45) Date of Patent: Oct. 10, 2017

(54) MOBILE COMMUNICATIONS DEVICE WITH A PRIVATE ZONE AND A NON-PRIVATE ZONE AND METHODS OF DISPLAYING COMMUNICATIONS IN THE SAME

(71) Applicant: MOTOROLA SOLUTIONS, INC., Schaumburg, IL (US)

(72) Inventors: Eng Wiang Chan, Penang (MY); Prebesh Pavithran, Bukit Tengah (MY)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 15/055,922

(22) Filed: Feb. 29, 2016

(65) Prior Publication Data
US 2017/0251361 A1    Aug. 31, 2017

(51) Int. Cl.
*H04W 12/02*   (2009.01)
*H04W 4/12*    (2009.01)
*H04M 3/42*    (2006.01)

(52) U.S. Cl.
CPC ....... *H04W 12/02* (2013.01); *H04M 3/42042* (2013.01); *H04W 4/12* (2013.01); *H04M 2203/2038* (2013.01)

(58) Field of Classification Search
CPC ... H04W 12/02; H04W 4/12; H04M 3/42042; H04M 2203/2038
See application file for complete search history.

(56) References Cited

U.S. PATENT DOCUMENTS

| | | | |
|---|---|---|---|
| 6,765,550 B2 | 7/2004 | Janick et al. | |
| 6,874,127 B2 * | 3/2005 | Newell | G06F 1/163 706/14 |
| 7,353,035 B1 * | 4/2008 | Kupsh | H04W 4/14 370/352 |
| 7,779,475 B2 | 8/2010 | Jakobson et al. | |
| 8,405,572 B1 | 3/2013 | Want et al. | |

(Continued)

FOREIGN PATENT DOCUMENTS

EP    0802684    10/2001

OTHER PUBLICATIONS

PCT/US2017/015614 International Search Report and Written Opinion of the International Searching Authority dated May 15, 2017 (14 pages).

*Primary Examiner* — Nathan Mitchell
(74) *Attorney, Agent, or Firm* — Michael Best & Friedrich LLP

(57) ABSTRACT

A mobile communications device with a private zone and a non-private zone and methods of displaying communications in the same. In one embodiment, the mobile communications device includes a display having a private zone in which viewing is relatively more restricted and a non-private zone in which viewing is relatively less restricted. The mobile communications device further includes a transceiver to transmit and receive communications and an electronic processor electrically coupled to the transceiver and to the display. The electronic processor is configured to receive a message and determine whether the message is private. The electronic processor displays the message in the private zone when the message is private.

18 Claims, 9 Drawing Sheets

(56) References Cited

U.S. PATENT DOCUMENTS

| | | | |
|---|---|---|---|
| 8,811,951 B1* | 8/2014 | Faaborg | H04M 1/57 340/384.1 |
| 8,922,480 B1* | 12/2014 | Freed | G09G 5/00 345/156 |
| 8,928,555 B2 | 1/2015 | Want et al. | |
| 9,058,509 B1* | 6/2015 | Yang | G06F 21/84 |
| 9,372,997 B2* | 6/2016 | Robison | G06F 21/60 |
| 9,507,959 B2* | 11/2016 | Yamashirodani | G06F 21/608 |
| 2004/0111482 A1* | 6/2004 | Bourges-Waldegg | H04L 29/06 709/207 |
| 2006/0183505 A1* | 8/2006 | Willrich | G06F 1/1616 455/566 |
| 2008/0051072 A1* | 2/2008 | Kraft | G06F 21/6245 455/418 |
| 2009/0102770 A1 | 4/2009 | Iwata et al. | |
| 2009/0273562 A1* | 11/2009 | Baliga | G06F 3/013 345/157 |
| 2010/0275266 A1 | 10/2010 | Jakobson et al. | |
| 2011/0148938 A1* | 6/2011 | Yang | G09C 5/00 345/690 |
| 2011/0279472 A1* | 11/2011 | Lu | G09G 5/06 345/589 |
| 2012/0151601 A1* | 6/2012 | Inami | G06T 1/00 726/26 |
| 2013/0103943 A1* | 4/2013 | Hirsch | G09C 5/00 713/168 |
| 2013/0162924 A1 | 6/2013 | Sahouani et al. | |
| 2013/0276101 A1* | 10/2013 | Rautenbach | G06F 21/31 726/19 |
| 2014/0082745 A1* | 3/2014 | Guedalia | G06F 3/0481 726/27 |
| 2014/0176562 A1* | 6/2014 | Somerfield | G06T 11/00 345/443 |
| 2014/0244505 A1* | 8/2014 | Kim | G06F 3/014 705/44 |
| 2014/0283100 A1 | 9/2014 | Harrison | |
| 2015/0007346 A1* | 1/2015 | Delia | G06F 21/84 726/28 |
| 2015/0101066 A1* | 4/2015 | Fram | G06F 19/321 726/28 |
| 2015/0141088 A1* | 5/2015 | Hosoi | H04M 1/035 455/575.1 |
| 2015/0160788 A1* | 6/2015 | Sun | G06F 3/04817 715/746 |
| 2015/0195709 A1* | 7/2015 | Hilz | H04L 12/587 455/411 |
| 2015/0213274 A1 | 7/2015 | Xu et al. | |
| 2015/0370108 A1* | 12/2015 | Wu | G02F 1/133308 349/58 |
| 2016/0044502 A1* | 2/2016 | Jung | H04M 1/7253 455/411 |
| 2016/0132721 A1* | 5/2016 | Bostick | G06F 21/60 382/118 |
| 2016/0225343 A1* | 8/2016 | Ek | G09G 5/026 |
| 2016/0234276 A1* | 8/2016 | Ouyang | H04L 65/403 |
| 2016/0253141 A1* | 9/2016 | Sarkar | G06F 3/1423 345/156 |
| 2016/0285893 A1* | 9/2016 | Childress | H04L 63/0428 |
| 2016/0300081 A1* | 10/2016 | Weksler | G06F 21/84 |
| 2016/0358014 A1* | 12/2016 | Cohen | G06K 9/00288 |

* cited by examiner

MOBILE COMMUNICATIONS DEVICE
WITH A PRIVATE ZONE AND A
NON-PRIVATE ZONE AND METHODS OF
DISPLAYING COMMUNICATIONS IN THE
SAME

BACKGROUND OF THE INVENTION

Mobile communications devices are used by private individuals and in a variety of organizations. Certain organizations, for example, public safety organizations (emergency management agencies, law enforcement agencies, fire departments, emergency medical service providers, and the like) may use mobile communications devices within private networks. Regardless of whether mobile communications devices are used by private individuals or by public or government agencies and whether the devices are used within private networks or public networks, certain communications may be private or confidential, for example, intended for receipt by a particular person associated with a particular mobile communications device. While credentials (for example, a password or personal identification number (PIN)), may help control access to a mobile communications device, once a mobile communications device is unlocked (for example, using the credentials) it can be difficult to maintain the privacy of any messages received by the device.

BRIEF DESCRIPTION OF THE SEVERAL
VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
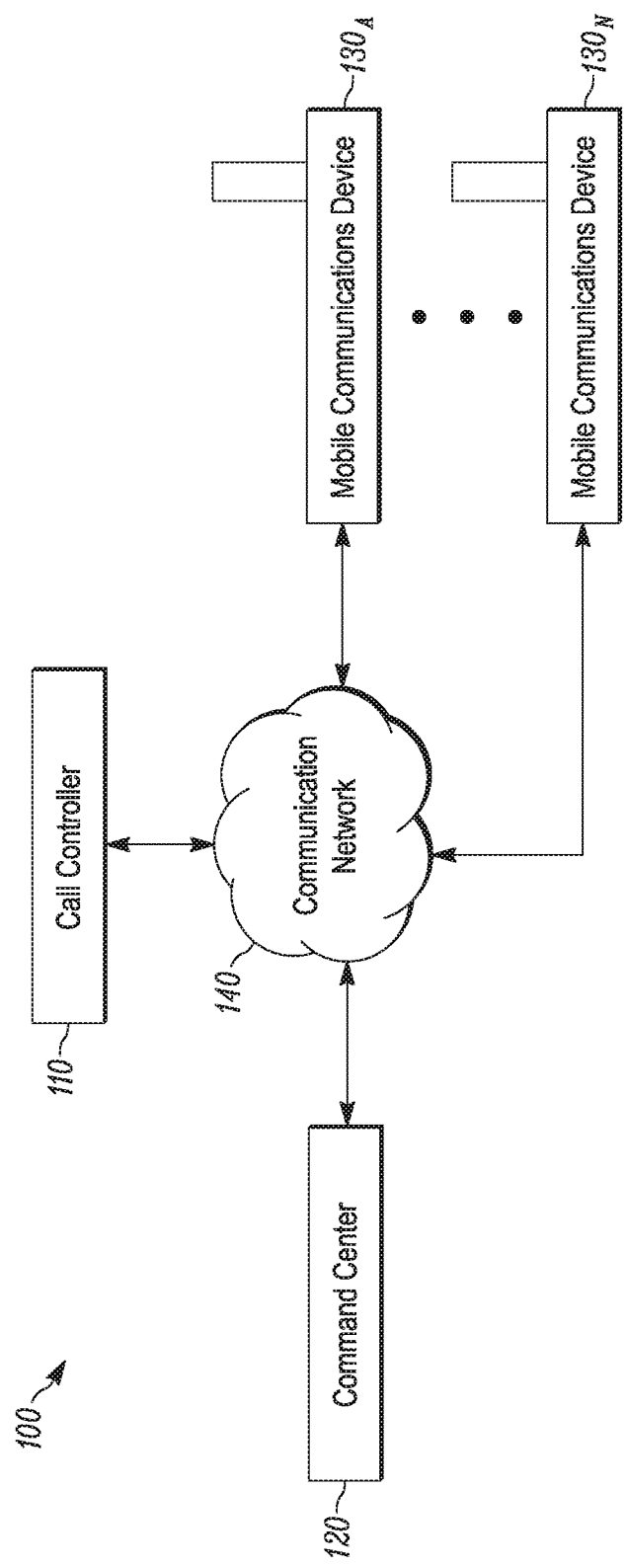
FIG. 1 is a block diagram of a communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE
INVENTION

One embodiment provides a mobile communications device including a display having a private zone in which viewing is relatively more restricted and a non-private zone in which viewing is relatively less restricted. The mobile communications device also includes a transceiver to transmit and receive communications and an electronic processor electrically coupled to the transceiver and to the display. The electronic processor is configured to receive, via the transceiver, a first message and determine based on one or more of a content of the first message, a context of the first message, and a detected user input, whether the first message is private. When the first message is private, the electronic processor is configured to display the first message in the private zone of the display.

Another embodiment provides a method of displaying communications on a display of a mobile communications device. The method includes providing a private zone in which viewing is relatively more restricted and a non-private zone in which viewing is relatively less restricted. The method further includes receiving, with a transceiver, a first message and determining, with an electronic processor, based on one or more of a content of the first message, a context of the first message and a detected user input, whether the first message is private. The method also includes displaying the first message in the private zone when the first message is private.

FIG. 1 is a block diagram of a communications system 100. In some embodiments, the communications system 100 may be a system designed for use by public safety organizations, to facilitate communications between members of the organization. In other embodiments, the communications system 100 is designed for use by a broader user base. In the example illustrated in FIG. 1, the communications system 100 includes a call controller 110, a command center 120, and one or more mobile communications devices 130A through 130N communicating over a communication network 140. It should be understood that FIG. 1 illustrates only one exemplary embodiment of a communications system 100 and that the communications system 100 may include more or less components and may perform additional functions other than those described herein. For example, when designed for use for by non-governmental organizations, communications system 100 may not include a command center 120.

The call controller 110 may be a central controller used by, for example, a government or a private organization to manage calls and messages between the command center 120 and mobile communications devices 130A through 130N, and/or between one or more mobile communications devices 130A through 130N. The command center 120 provides, among other things, centralized command for a public safety organization. For example, the command center 120 may be a dispatch center used by a police department or a fire department.

The mobile communications devices 130A through 130N may, for example, be used by members of a public safety organization, such as police officers, fire fighters, first responders, and the like to communicate with the command center 120 and/or among themselves. Each of the mobile communications devices 130A through 130N may be a smart telephone, a mobile radio, a cellular telephone, a pager, a smart watch, a tablet computer, personal digital assistant (PDA) or other communication device. In some embodiments, one or more fixed communications devices may communicate with the command center 120 and/or among themselves. The communications system 100 may include various combinations of such devices.

Each of the mobile communications devices 130A through 130N may communicate with one or more of the other mobile communications devices 130A through 130N, the command center 120, and the call controller 110 over the communication network 140. The communication network 140 may comprise one or more known networks including, for example, a land mobile radio (LMR) network, a terrestrial trunked radio (TETRA) network, or a digital mobile radio (DMR) network. Alternatively or in combination, the communication network 140 may also include a wide area network (WAN) (for example, a transport control protocol/internet protocol (TCP/IP) based network), a cellular network, such as, for example, a Global System for Mobile Communications (or Groupe Spécial Mobile (GSM)) network, a General Packet Radio Service (GPRS) network, a Code Division Multiple Access (CDMA) network, an Evolution-Data Optimized (EV-DO) network, an Enhanced Data Rates for GSM Evolution (EDGE) network, a 3GSM network, a 4GSM network, a Digital Enhanced Cordless Telecommunications (DECT) network, a Digital advanced mobile phone system (AMPS) (IS-136/time division multiple access (TDMA)) network, or an Integrated Digital Enhanced Network (iDEN) network, and the like). In other embodiments, the communication network 140 may include a local area network (LAN), a neighborhood area network (NAN), a home area network (HAN), or personal area network (PAN) employing various communications protocols, such as Wi-Fi™, Bluetooth®, ZigBee®, and the like.

The command center 120 and the one or more mobile communications devices 130A through 130N may send voice, text, and data messages to other mobile communications devices 130A through 130N. As described in greater detail below, the display of one or more mobile communications devices 130A through 130N may include a private zone and a non-private zone and be configured so that, among other things, private messages are displayed in the private zone of the display.

Figure 2:
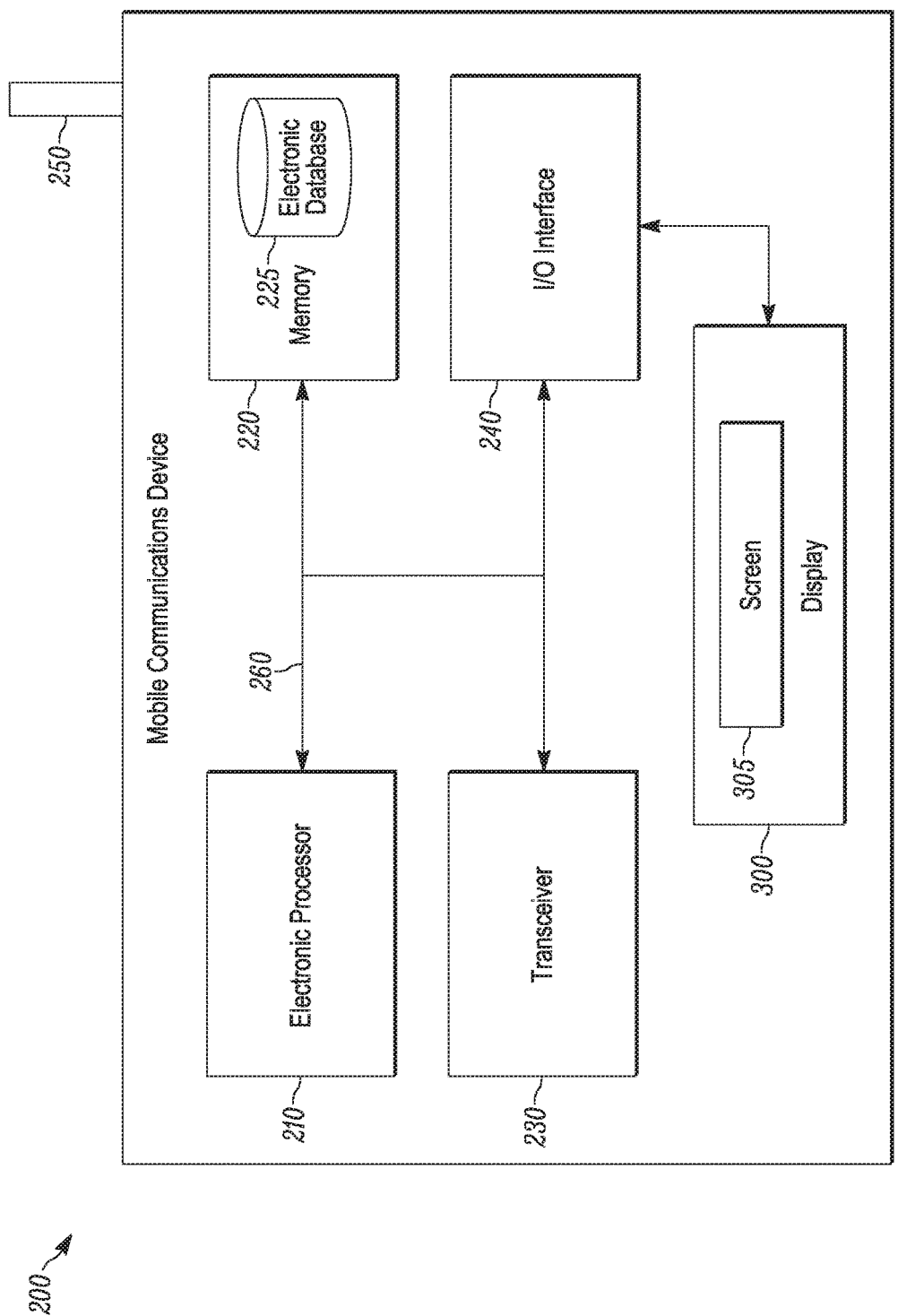
FIG. 2 is a block diagram of a mobile communications device in accordance with some embodiments.

FIG. 2 is a block diagram of a privacy-enhanced mobile communications device 200 and, in certain embodiments, one or more of the mobile communications devices 130A through 130N are configured to have the features of the privacy-enhanced mobile communications device 200. In the illustrated example, the privacy-enhanced mobile communications device 200 includes an electronic processor 210, a memory 220, a transceiver 230, an input/output (I/O) interface 240, and an antenna 250. The electronic processor 210, the memory 220, the transceiver 230, and the input/output interface 240 communicate over one or more control and/or data buses or similar connections. In the example illustrated, these components are connected via a communication bus 260. It should be understood that FIG. 2 displays only one exemplary embodiment of a privacy-enhanced mobile communications device 200 and that other embodiments having more or less components are within the scope of this disclosure.

In some embodiments, the electronic processor 210 is implemented partially or entirely as a semiconductor chip, a field-programmable gate array (FPGA), an application specific integrated circuit (ASIC), and the like. The memory 220 may include non-transitory memory that stores instructions that are received and executed by the electronic processor 210 to carry out functionality of the privacy-enhanced mobile communications device 200 described herein. The memory 220 may include, for example, a program storage area and a data storage area. The memory also includes an electronic database 225 that may be used to store certain keywords and information regarding private messages, as discussed in further detail below. The memory 220 may include combinations of different types of memory, such as a hard disk, a CD-ROM (Compact Disc Read Only Memory) device, an optical storage device, a magnetic storage device, ROM (Read Only Memory), PROM (Programmable Read Only Memory), EPROM (Erasable Programmable Read Only Memory), EEPROM (Electrically Erasable Programmable Read Only Memory), or flash memory, for example.

The transceiver 230 sends and receives data over the communication network 140 through the antenna 250. The input/output interface 240 includes one or more input mechanisms, one or more output mechanisms, or a combination thereof. For example, the input/output interface 240 may include a display 300 to display messages to a user of the privacy-enhanced mobile communications device 200. The display 300 includes a screen 305. In some embodiments, the screen 305 is a touch screen.

The electronic processor 210 is configured to receive incoming messages from the transceiver 230. The electronic processor 210 uses application software stored in the memory to process the received message and determine whether the message is private or non-private. Several techniques may be used to determine whether a received message is private or non-private. Some of these techniques are described in detail below. When the electronic processor 210 determines that the message is private, the electronic processor 210 displays the message in a private-zone of the display 300 of the privacy-enhanced mobile communications device 200. When the electronic processor 210 determines that the message is not private, the electronic processor 210 may display the message in the non-private zone, or in both the private zone and the non-private zone.

Figure 3:
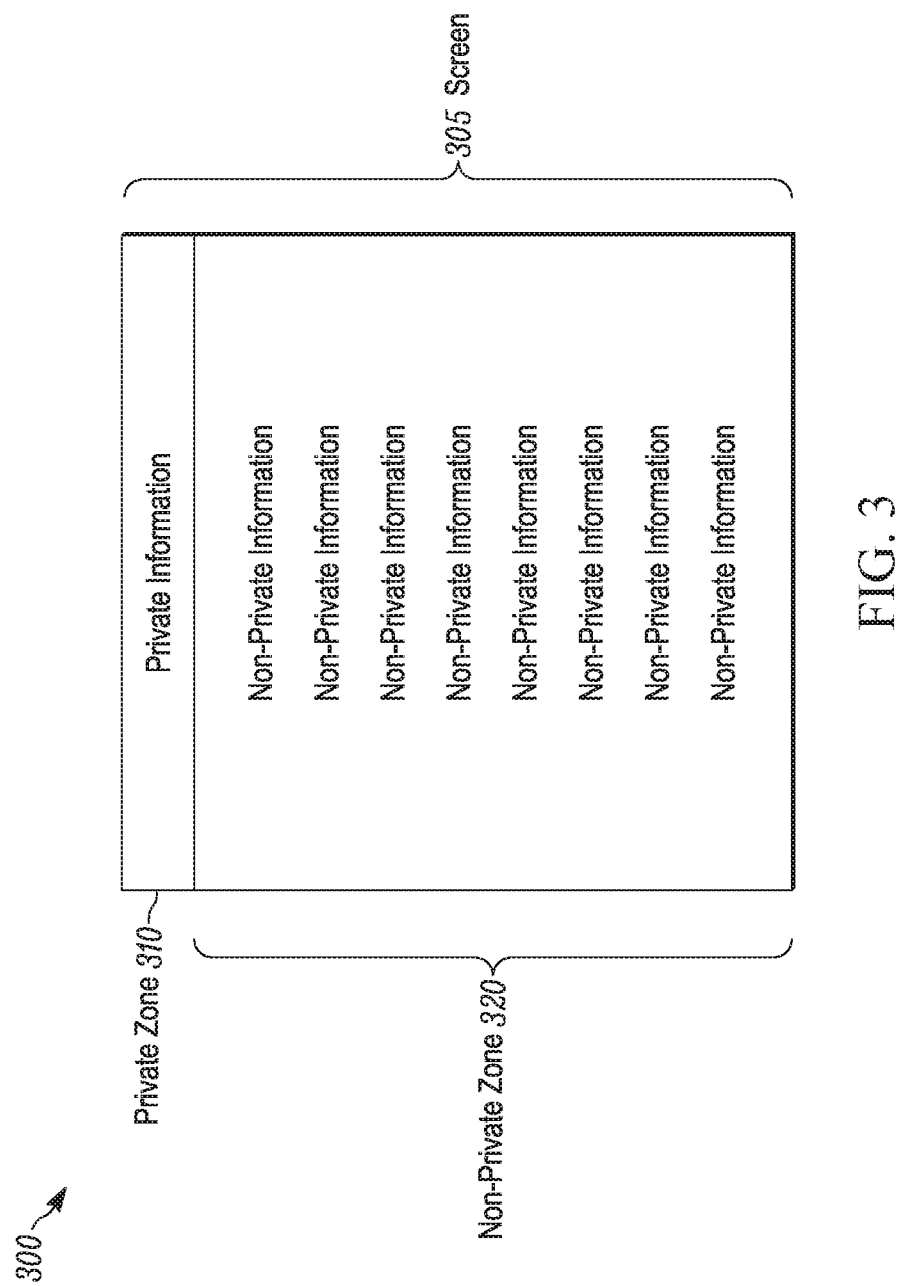
FIG. 3 illustrates a display unit of a mobile communications device in accordance with some embodiments.

FIG. 3 illustrates the display 300 of the privacy-enhanced mobile communications device 200 in greater detail. The display 300 is divided into two zones: a private zone 310 and a non-private zone 320. In one embodiment, the display 300 has a private zone 310 in which viewing is relatively more restricted and a non-private zone 320 in which viewing is relatively less restricted. The private zone 310 may be formed by positioning or mounting a light control film over an area of the display 300. In other embodiments different types of light control mechanisms maybe used. For example, the screen 305 of the display 300 may include a light-control layer such as a controllable layer of liquid crystals whose alignment may be altered via the application of an electric or magnetic field. In certain embodiments, the light control film is a microreplicated film (for example, the light control film may be a privacy filter such as an advanced light control film ALCF-P ABR 2 from the 3M Company) that controls the amount of light that passes through the film at high angles. When used, the light control film allows light from the display 300 to pass through the private zone 310 at angles perpendicular and in a range offset from perpendicular (for example, at angles 0° to 30° from perpendicular) to the surface of the display 300. At other angles (for example, at angles greater than 30° from perpendicular), the light control film blocks the majority of the light. In other words, a user of the privacy-enhanced mobile communications device 200 will be able to see the information displayed in the private zone 310 only when viewing the private zone 310 at angles that are perpendicular and/or within a range from perpendicular to the surface of the display 300. Still other mechanisms such as restricting viewing at other angles or using mechanical walls to shield the private zone 310 may be utilized.

The non-private zone 320 may not include a light control film or other light-control mechanism to block any incident light. In some embodiments, the non-private zone 320 may include a light control or shielding mechanism that is relatively less restricting than mechanism used for the private zone 310. As a result, information displayed in the non-private zone 320 is viewable at most angles. It should be understood that FIG. 3 illustrates only one exemplary location of the private zone 310 and the non-private zone 320 and that other embodiments having different locations for the private zone 310 and the non-private zone 320 are within the scope of this disclosure.

The dimensions of the private zone 310 and the non-private zone 320 are input to the electronic processor 210. In some embodiments, the dimensions of the private zone 310 and the non-private zone 320 along with the dimension of the screen 305 are preprogrammed in the memory 220. In some embodiments, the dimensions of the private zone 310 and the non-private zone 320 may be input by a user of the privacy-enhanced mobile communications device 200 or an administrator of privacy-enhanced mobile communications device 200, for example, through a settings feature. The electronic processor 210 confines the display of the private messages to the private zone 310. In some embodiments, the memory stores instructions to generate a graphical user interface (GUI) and the dimensions of windows generated as part of the graphical user interface are dimensioned in accordance with the dimensions of the private zone 310 and non-private zone 320. Messages that are not private are displayed either within the non-private zone 320 or in both the private zone 310 and the non-private zone 320.

Figure 4:
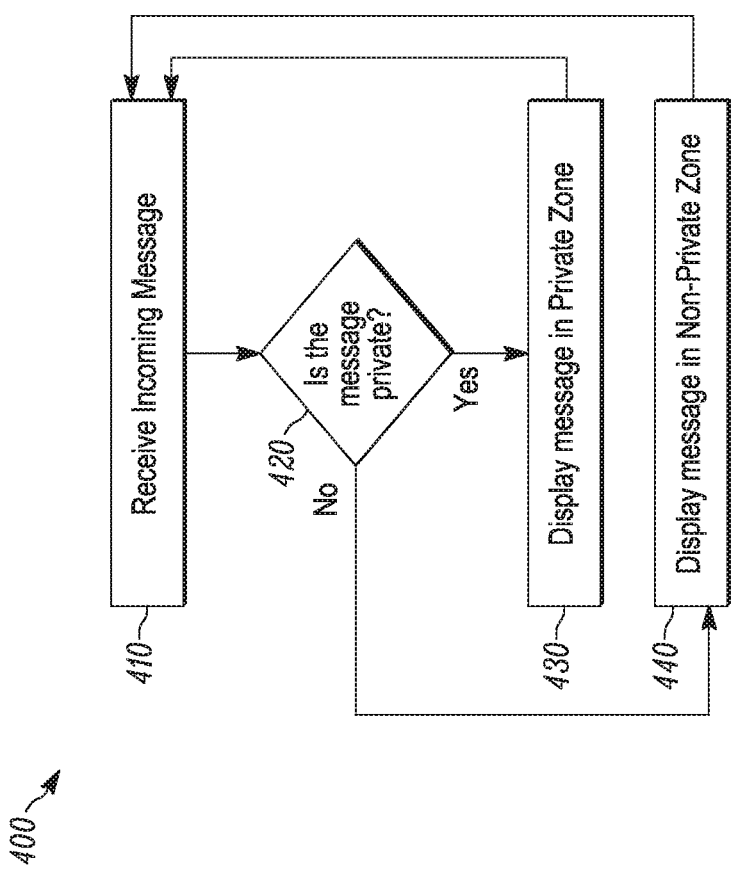
FIG. 4 is a flowchart of a method of displaying private messages on a mobile communications device in accordance with some embodiments.

FIG. 4 is a flowchart illustrating an exemplary method 400 of displaying private messages on the privacy-enhanced mobile communications device 200. As illustrated in FIG. 4, the privacy-enhanced mobile communications device 200 receives an incoming message over the communication network 140 (at block 410). As discussed above, the transceiver 230 of the privacy-enhanced mobile communications device 200 receives the incoming message through the antenna 250.

At block 420, the electronic processor 210 determines whether the message is a private message. Several techniques may be used by the electronic processor 210 to determine whether the incoming message is a private message. Some exemplary techniques are described below. However, it should be understood that additional techniques may be used, or the described techniques may be modified without departing from the scope of the invention.

When the electronic processor 210 determines that the incoming message (for example, first message) is a private message, the method continues to block 430. At block 430, the privacy-enhanced mobile communications device 200 displays the image in the private zone 310 of the display 300. The method 400 then proceeds to block 410 to receive the next message.

Returning to block 420, when the privacy-enhanced mobile communications device 200 determines that the incoming message (for example, second message) is a non-private message, the method continues to block 440. At block 440, the privacy-enhanced mobile communications device 200 displays the message in the non-private zone 320 of the display 300. The method 400 then proceeds to block 410 to receive the next message.

Figure 5:
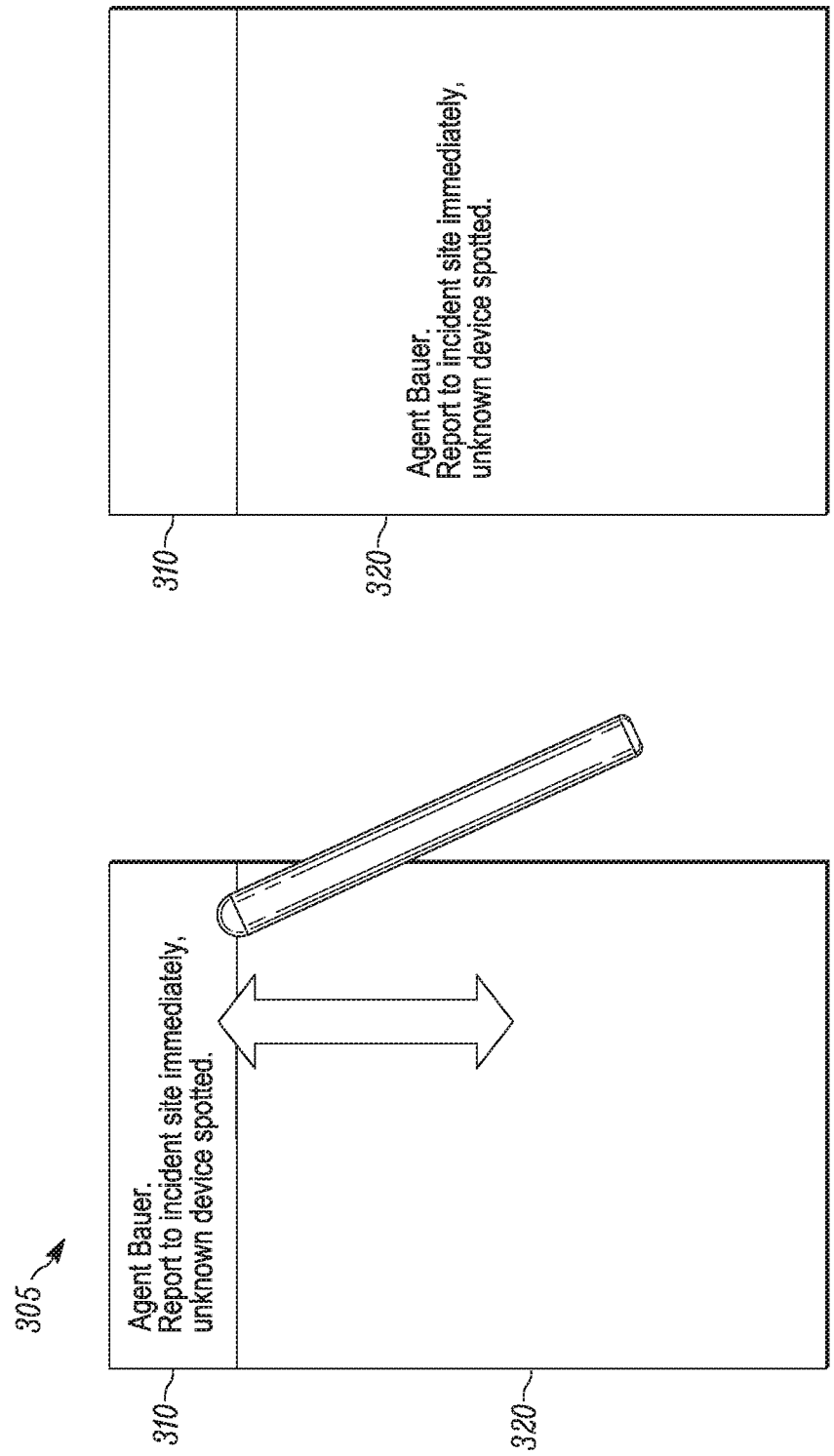
FIG. 5 illustrates a graphical user interface of the mobile communications device in accordance with some embodiments.

One technique that may be used to determine whether a received message is private is based on detecting a user input. FIG. 5 illustrates one example of this technique. All received messages are first displayed in the private zone 310. When the electronic processor 210, via the input/output interface 240, receives an input to move the message to the non-private zone 320, the electronic processor 210 may display the message in the non-private zone 320 in response to the input. One example of receiving an input is when the input/output interface 240 receives a cursor-control signal effecting a drag operation to drag the message from the private zone 310 to the non-private zone 320 on a touch screen (as shown in the FIG. 5).

Figure 6:
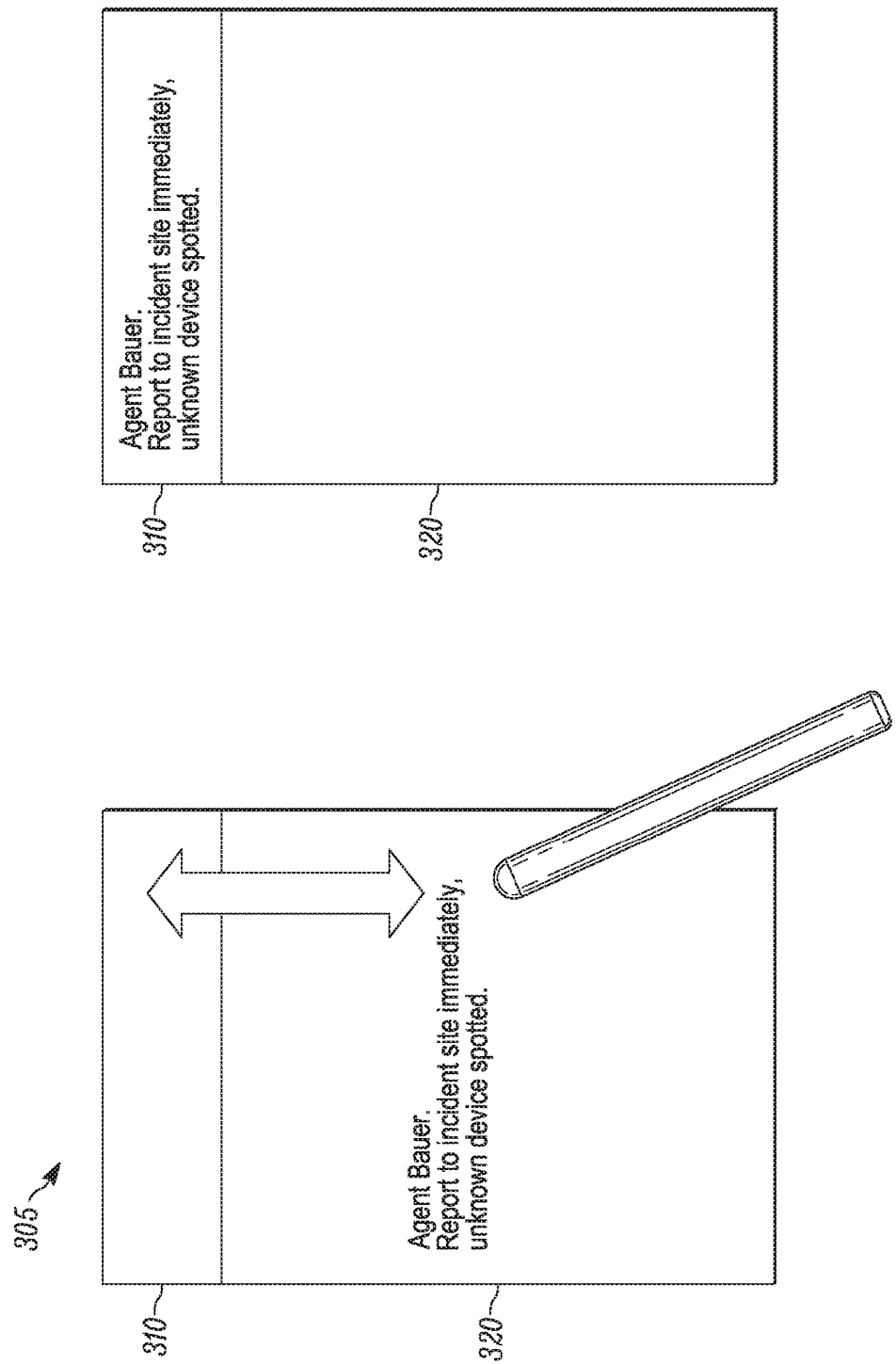
FIG. 6 illustrates a graphical user interface of the mobile communications device in accordance with some embodiments.

In another example, as illustrated in FIG. 6, all received messages are always displayed in the non-private zone 320. Similar to the above example, when the electronic processor 210, via the input/output interface 240, receives an input to move the message, such as receiving a cursor-control signal effecting a drag operation to drag the message from the non-private zone 320 to the private zone 310 on a touch screen, the electronic processor 210 displays the message in the private zone 310 in response to the input.

Figure 7:
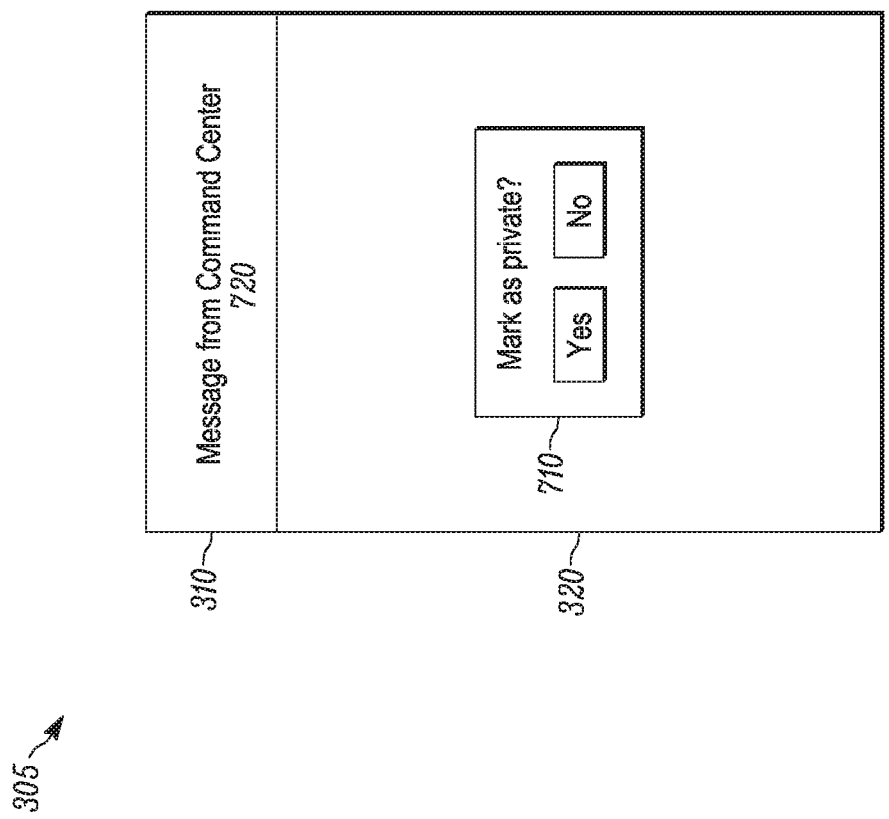
FIG. 7 illustrates an input mechanism of a graphical user interface of the mobile communications device in accordance with some embodiments.

FIG. 7 illustrates yet another example of determining whether a message is private based on detecting a user input. As illustrated in FIG. 4, the electronic processor 210 may generate a prompt 710 to be displayed on the screen 305. Based on the input received, the electronic processor 210 may display the message in the appropriate zone. In this example, an information banner 720 may be displayed that includes certain parts of the message, information about the sender, or other information that helps the user determine whether the message is private.

Figure 8:
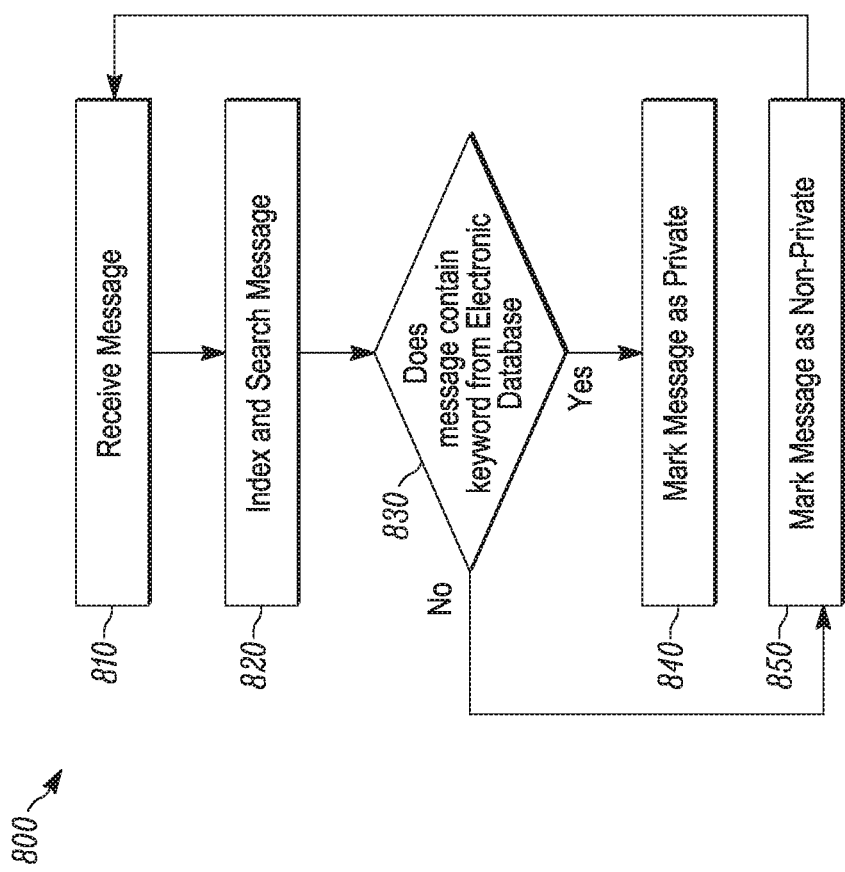
FIG. 8 is a flowchart of a method of determining whether a message is private based on the content of the message in accordance with some embodiments.

Another technique that may be used to determine whether a received message is private may be based on the content of the message. The privacy-enhanced mobile communications device 200 may maintain an electronic database 225 including a table keywords in the memory 220 or in a second memory. FIG. 8 is a flowchart illustrating an exemplary method 800 for determining whether a received message is private based on the content of the message. As illustrated in FIG. 8, the privacy-enhanced mobile communications device 200 receives an incoming message over the communication network 140 (at block 810). As discussed above, the transceiver 230 of the privacy-enhanced mobile communications device 200 receives the incoming message through the antenna 250.

The electric processor may index and search the received message to determine whether the message contains one of the keywords from the electronic database 225 (at block 820 and 830). For example a string searching or a string matching technique may be used to determine whether the message contains one of the keywords from the electronic database 225.

When the received message includes at least one keyword from the electronic database 225, the electronic processor 210 marks the message as private and displays the message in the private zone 310 (block 840). The method 800 then proceeds to block 810 to receive the next message. Returning to block 830, when the received message does not include at least one keyword from the electronic database 225, the electronic processor 210 marks the message as not private and displays the message in the non-private zone 320 (at block 850). The method 800 then proceeds to block 810 to receive the next message.

Figure 9:
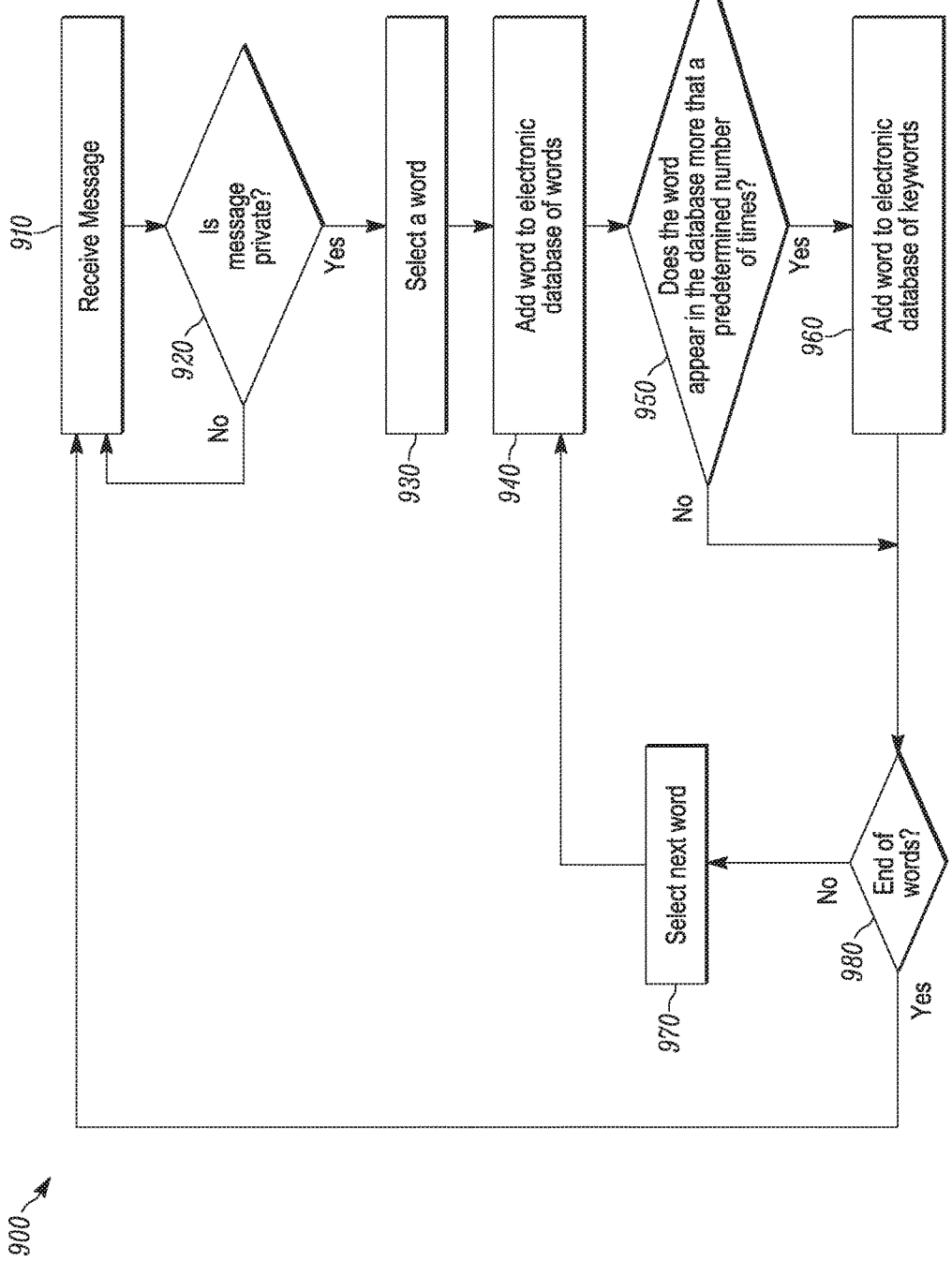
FIG. 9 is a flowchart of a method of populating an electronic database of keywords in accordance with some embodiments.

In some embodiments, the electronic processor 210 continuously populates the electronic database 225 by analyzing a plurality of received messages. FIG. 9 illustrates an exemplary method 900 of populating an electronic database of keywords. As illustrated in FIG. 9, the electronic processor 210 receives a message (at block 910) and determines whether the received message is private (at block 920). The privacy-enhanced mobile communications device 200 may use any of the techniques described above and below to determine whether a message is private. When the electronic processor 210 determines that the received message is not private, the method 900 proceeds to block 910 to receive the next message.

Returning to block 920, when the electronic processor 210 determines that the message is private, the electronic processor 210 selects a word from the message (at block 930). The electronic processor 210 adds the word to a database of words that may be stored in the memory 220 or a second memory (at block 940). The electronic processor 210 then refers the database to determine whether the word has appeared more than a predetermined number of times in private messages (at block 950). In some embodiments, the predetermined number may be preprogrammed into the privacy-enhanced mobile communications device 200. In other embodiments, the predetermined number may be input by a user of the privacy-enhanced mobile communications device 200 or an administrator of privacy-enhanced mobile communications device 200, for example, through a settings feature.

When the electronic processor 210 determines that the selected word has appeared more than a predetermined number of times in private messages (that is, the electronic processor 210 identifies a common keyword), the electronic processor 210 adds the word to the table of keywords in the electronic database 225 (at block 960). The method 900 then proceeds to select the next word in the message (at block 970) to determine the frequency of the word until all words in the message are processed (block 980). At which point, the method 900 proceeds to block 910 to receive and analyze the next message. In some embodiments, the electronic processor 210 may add all words (or all words excluding prepositions, articles and the like) in a private message to the keyword table in the electronic database 225.

Yet another technique that may be used to determine whether a received message is private may be based on the context of the message. The privacy-enhanced mobile communications device 200 may analyze a number of attributes of a received message to determine whether the message is private. In one example of this technique, each message may include an identifier that identifies whether a message is private. The identifier may include bit(s) that are assigned to a privacy status of a message. Based on the value of the bit(s), the electronic processor 210 may identify whether the message is private. For example, the sending device (for example, a command center 120 or one of the one or more mobile communications devices 130A through 130N configured to have the features and functionality of the privacy-enhanced mobile communications device 200) may mark (for example, via an input mechanism) the message private before sending the message. The sender device then sets the bit(s) to a certain value (for example, 1). The receiving device (for example, one or more of the mobile communications devices 130A through 130N configured in accordance with the privacy-enhanced mobile communications device 200) may then identify the message as private once it determines that the bit(s) assigned to privacy status is a certain value (for example, 1) and display the message in the private zone 310. Conversely, the receiving device may identify the message as not private when it determines that the bit(s) assigned to privacy status have a value corresponding to a non-private message and display the message in the non-private zone 320.

In another example, the privacy-enhanced mobile communications device 200 may determine that a message is private when the message is sent from a particular mobile communications device 130 (for example, a supervisor's mobile communications device) or the command center 120. In this example, each message sent may contain a header information or identifier information indicating the original device sending the message (for example, the message may include a command center identifier). The receiving device may then refer to this header and based on the sender may determine that the message is private. For example, the privacy-enhanced mobile communications device 200 may determine that the received message is from the command center 120 and mark the message as private. The privacy-enhanced mobile communications device 200 may mark all other messages as non-private. In some embodiments, the header information or identifier information may also include information identifying a hardware identifier of a sender, a rank of the sender, a department of the sender, a job function of the sender and the like. The privacy-enhanced mobile communications device 200 may refer to this identifying information and determine that a message is private when the identifying information contains predetermined information.

In other examples, the privacy-enhanced mobile communications device 200 may determine that a message is private when the message is received in a particular timeslot, from a particular channel, from a particular talkgroup in a particular frequency and the like. Similar to the previous example, the privacy-enhanced mobile communications device 200 may refer to the header information or identifier information of the received message to determine whether the message meets any of the above-mentioned criteria. When the message meets the criteria, the privacy-enhanced mobile communications device 200 displays the message in the private zone 310. Conversely, when the message does not meet the criteria, the privacy-enhanced mobile communications device 200 displays the message in the non-private zone 320.

Although the above methods are described as being performed by the privacy-enhanced mobile communications device 200, it should be understood that some or all of these methods may be performed by other devices such as the command center 120, the call controller 110, an accessory device to any of these devices, or a combination thereof.

In some embodiments, the privacy-enhanced mobile communications device 200 may generate an alert when the privacy-enhanced mobile communications device 200 receives a private message. This alert may take any form such as audible, haptic, visual, and the like. For example, in some embodiments, the privacy-enhanced mobile communications device 200 may display a private message in a different color than a non-private message. In other embodiments, the privacy-enhanced mobile communications device 200 may generate a sound alert, flash a light emitter diode (LED) indicator, and the like to alert a user to a private message.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A mobile communications device comprising:
   a display having a private zone in which viewing is relatively more restricted and a non-private zone in which viewing is relatively less restricted;
   a transceiver to transmit and receive communications;
   an electronic processor electrically coupled to the transceiver and to the display and configured to:
      receive, via the transceiver, a first message;
      determine whether the first message is private by determining whether the first message includes a keyword included in an electronic database of keywords;
      when the first message is private, display the first message in the private zone of the display;
      analyze a plurality of private messages;
      identify a common keyword in the plurality of private messages; and
      when the common keyword is identified in a predetermined number of the plurality of private messages, add the common keyword to the electronic database of keywords.

2. The mobile communications device of claim 1, further comprising a light control film mounted on the private zone of the display.

3. The mobile communications device of claim 2, wherein the electronic processor is further configured to:
   receive, via the transceiver, a third message;
   determine, based on one or more of a content of the third message, a context of the third message, and a detected user input, whether the third message is private; and
   when the third message is private, display the third message in the private zone.

4. The mobile communications device of claim 3, wherein the electronic processor is configured to determine whether the third message is private by determining whether the third message includes a command center identifier.

5. The mobile communications device of claim 3, wherein the electronic processor is configured to determine whether the third message is private by determining whether the third message is received from one of the group consisting of a talkgroup, a frequency, a channel, and a timeslot.

6. The mobile communications device of claim 3, wherein the third message includes one from a group consisting of a hardware identifier of a sender, a rank of the sender, and a job function of the sender and wherein the electronic processor is configured to determine whether the third message is private based on one from the group consisting of the hardware identifier of the sender, the rank of the sender, and the job function of the sender.

7. The mobile communications device of claim 1, wherein the first message is displayed in the private zone, the electronic processor further configured to
receive an input from a user interface, and
in response to the received input, display the first message in the non-private zone.

8. The mobile communications device of claim 1, wherein the electronic processor is further configured to generate an alert when the first message is private.

9. The mobile communications device of claim 1, wherein the electronic processor is further configured to
receive, via the transceiver, a second message;
determine, with the electronic processor, whether the second message is private; and
when the second message is not private, display the second message in the non-private zone.

10. A method of displaying communications on a display of a mobile communications device, the method comprising:
providing a private zone in which viewing is relatively more restricted and a non-private zone in the display in which viewing is relatively less restricted;
receiving, with a transceiver, a first message;
determining whether the first message is private by determining whether the first message includes a keyword included in an electronic database of keywords;
when the first message is private, displaying the first message in the private zone;
analyzing, with the electronic processor, a plurality of private messages;
identifying a common keyword in the plurality of private messages, the common keyword being present in a predetermined number of the plurality of private messages; and
adding the common keyword to the electronic database of keywords.

11. The method of claim 10, further comprising positioning a light control film over the private zone of the display.

12. The method of claim 10, further comprising receiving an input from a user interface, and displaying the first message in the non-private zone in response to receiving the input.

13. The method of claim 10, further comprising generating, with the electronic processor, an alert when the first message is private.

14. The method of claim 10, further comprising:
receiving, with the transceiver, a second message;
determining, with the electronic processor, whether the second message is private; and
when the second message is not private, displaying the second message in the non-private zone.

15. The method of claim 10, further comprising:
receiving, with a transceiver, a third message;
determining, with an electronic processor, based on one or more of a content of the third message, a context of the third message, and a detected user input, whether the third message is private; and
when the third message is private, displaying the third message in the private zone.

16. The method of claim 15, wherein determining, with the electronic processor, whether the third message is private further comprises determining whether the third message includes a command center identifier.

17. The method of claim 15, wherein determining, with the electronic processor, whether the third message is private further comprises determining whether the third message is received from one of a group consisting of a particular talkgroup, a particular frequency, a particular channel, and a particular timeslot.

18. The method of claim 15, wherein the third message includes one from a group consisting of a hardware identifier of a sender, a rank of the sender, and a job function of the sender and wherein determining, with the electronic processor whether the third message is private is based on one from the group consisting of the hardware identifier of the sender, the rank of the sender, and the job function of the sender.

* * * * *